United States Patent
Alvarez, Jr. et al.

(10) Patent No.: US 10,766,771 B2
(45) Date of Patent: Sep. 8, 2020

(54) METHODS AND SYSTEMS FOR PURIFYING HYDROGEN PEROXIDE SOLUTIONS

(71) Applicant: RASIRC, Inc., San Diego, CA (US)

(72) Inventors: Daniel Alvarez, Jr., Oceanside, CA (US); Christopher Ramos, Bonita, CA (US); Jeffrey J. Spiegelman, San Diego, CA (US)

(73) Assignee: RASIRC, Inc., San Diego, CA (US)

( * ) Notice: Subject to any disclaimer, the term of this patent is extended or adjusted under 35 U.S.C. 154(b) by 0 days.

(21) Appl. No.: 15/564,395

(22) PCT Filed: Apr. 6, 2016

(86) PCT No.: PCT/US2016/026095
§ 371 (c)(1),
(2) Date: Oct. 4, 2017

(87) PCT Pub. No.: WO2016/164380
PCT Pub. Date: Oct. 13, 2016

(65) Prior Publication Data
US 2018/0134554 A1    May 17, 2018

Related U.S. Application Data

(60) Provisional application No. 62/213,526, filed on Sep. 2, 2015, provisional application No. 62/143,356, filed on Apr. 6, 2015.

(51) Int. Cl.
*C01B 15/013* (2006.01)
*B01J 47/12* (2017.01)
(Continued)

(52) U.S. Cl.
CPC ........... *C01B 15/0135* (2013.01); *B01J 3/006* (2013.01); *B01J 39/18* (2013.01); *B01J 39/20* (2013.01);
(Continued)

(58) Field of Classification Search
None
See application file for complete search history.

(56) References Cited

U.S. PATENT DOCUMENTS

| 5,733,521 A | 3/1998 | Minamikawa et al. |
| 2001/0051128 A1 | 12/2001 | Hoffman et al. |

(Continued)

FOREIGN PATENT DOCUMENTS

| JP | 2007-515370 A | 6/2007 |
| TW | 201318965 A1 | 5/2013 |

(Continued)

OTHER PUBLICATIONS

PCT/US2016/026095 International Search Report dated Jul. 12, 2016.

(Continued)

*Primary Examiner* — Melissa S Swain
(74) *Attorney, Agent, or Firm* — Wagenknecht IP Law Group, PC (57) ABSTRACT

Compositions, methods, devices, and systems for purifying a source liquid from a replenishment stock solution that includes stabilizing agents, such as metal ions, prior to vaporization. Certain embodiments effect the purification with a solid perfluoronated ionomer, such as a perfluoronated ionomer membrane. Advantageously, source liquids purified in this manner provide feed stocks for production of ultra-pure gaseous reagents. As well, performance characteristics of membrane-based vaporizers relying on transport processes are improved.

28 Claims, 1 Drawing Sheet

(51) Int. Cl.
*B01J 39/20* (2006.01)
*B01J 49/53* (2017.01)
*B01J 3/00* (2006.01)
*B01J 39/18* (2017.01)
*B01J 47/02* (2017.01)
*C01B 15/017* (2006.01)
*C08L 81/08* (2006.01)

(52) U.S. Cl.
CPC ............... *B01J 47/02* (2013.01); *B01J 47/12* (2013.01); *B01J 49/53* (2017.01); *C01B 15/017* (2013.01); *C08L 81/08* (2013.01)

(56) References Cited

U.S. PATENT DOCUMENTS

| | | |
|---|---|---|
| 2009/0014901 A1 | 1/2009 | Spiegelman |
| 2014/0341800 A1 | 11/2014 | Tajima et al. |

FOREIGN PATENT DOCUMENTS

| | | |
|---|---|---|
| WO | 2014/014511 A1 | 1/2014 |
| WO | 2014014511 A1 | 1/2014 |
| WO | 2014/165637 A2 | 10/2014 |

OTHER PUBLICATIONS

Wikipedia, "Ion-Exchange Resin" Feb. 7, 2015 [online] [retrieved Oct. 4, 2017]. Retrieved from the Internet <https://en.wikipedia.org/w/index.php?title=Ion-exchange_resin&oldid=646045705> entire document.
TW105110753 Search Report dated Dec. 5, 2019.
JP2018-503730 First Office Action dated Jan. 7, 2020.

METHODS AND SYSTEMS FOR PURIFYING HYDROGEN PEROXIDE SOLUTIONS

CROSS-REFERENCE TO RELATED APPLICATIONS

This application is a 35 USC § 371 national phase application of International Application No. PCT/US2016/026095, filed Apr. 6, 2016, which claims the benefit of U.S. Provisional Application Ser. No. 62/143,356, filed on Apr. 6, 2015, and U.S. Provisional Application Ser. No. 62/213,526, filed on Sep. 2, 2015, the disclosures of which are hereby expressly incorporated by reference in their entirety and are hereby expressly made a portion of this application.

FIELD OF THE DISCLOSURE

This disclosure relates to methods and systems for purifying source liquids, particularly reactive source liquids, such as hydrogen peroxide or hydrazine, that may be used as a source for high purity process gases.

BACKGROUND

Various process gases may be used in the manufacturing and processing of microelectronics. In addition, a variety of chemicals may be used in other environments demanding high purity gases, e.g., critical processes, including without limitation microelectronics applications, wafer cleaning, wafer bonding, photoresist stripping, silicon oxidation, surface passivation, photolithography mask cleaning, atomic layer deposition, atomic layer etch, chemical vapor deposition, flat panel displays, disinfection of surfaces contaminated with bacteria, viruses and other biological agents, industrial parts cleaning, pharmaceutical manufacturing, production of nano-materials, power generation and control devices, fuel cells, power transmission devices, and other applications in which process control and purity are critical considerations. In those processes, it is necessary to deliver specific amounts of certain process gases under controlled operating conditions, e.g., temperature, pressure, and flow rate.

For a variety of reasons, gas phase delivery of process chemicals is preferred to liquid phase delivery. For applications requiring low mass flow for process chemicals, liquid delivery of process chemicals is not accurate or clean enough. Gaseous delivery would be desired from a standpoint of ease of delivery, accuracy and purity. Gas flow devices are better attuned to precise control than liquid delivery devices. Additionally, micro-electronics applications and other critical processes typically have extensive gas handling systems that make gaseous delivery considerably easier than liquid delivery. One approach is to vaporize the process chemical component directly at or near the point of use. Vaporizing liquids provides a process that leaves heavy contaminants behind, thus purifying the process chemical. However, for safety, handling, stability, and/or purity reasons, many process gases are not amenable to direct vaporization.

There are numerous process gases used in micro-electronics applications and other critical processes. Ozone is a gas that is typically used to clean the surface of semiconductors (e.g., photoresist stripping) and as an oxidizing agent (e.g., forming oxide or hydroxide layers). One advantage of using ozone gas in micro-electronics applications and other critical processes, as opposed to prior liquid-based approaches, is that gases are able to access high aspect ratio features on a surface. For example, according to the International Technology Roadmap for Semiconductors (ITRS), current semiconductor processes should be compatible with a half-pitch as small as 20-22 nm. The next technology node for semiconductors is expected to have a half-pitch of 14-16 nm, and the ITRS calls for <10 nm half-pitch in the near future. At these dimensions, liquid-based chemical processing is not feasible because the surface tension of the process liquid prevents it from accessing the bottom of deep holes or channels and the corners of high aspect ratio features, Therefore, ozone gas has been used in some instances to overcome certain limitations of liquid-based processes because gases do not suffer from the same surface tension limitations, Plasma-based processes have also been employed to overcome certain limitations of liquid-based processes. However, ozone- and plasma-based processes present their own set of limitations, including, inter alia, cost of operation, insufficient process controls, undesired side reactions, and inefficient cleaning.

More recently, hydrogen peroxide has been explored as a replacement for ozone in certain applications. However, hydrogen peroxide has been of limited utility, because highly concentrated hydrogen peroxide solutions present serious safety and handling concerns and obtaining high concentrations of hydrogen peroxide in the gas phase has been difficult, Hydrogen peroxide is typically available as an aqueous solution. In addition, because hydrogen peroxide has a relatively low vapor pressure (boiling point is approximately 150° C.), available methods and devices for delivering hydrogen peroxide generally do not provide hydrogen peroxide containing gas streams with a sufficient concentration of hydrogen peroxide.

For vapor pressure and vapor composition studies of various hydrogen peroxide solutions, see, e.g., *Hydrogen Peroxide*, Walter C. Schumb, Charles N. Satterfield and Ralph L. Wentworth, Reinhold Publishing Corporation, 1955, New York, available at http:/lhdl.handle.neU2027/mdp.39015003708784. Moreover, studies show that delivery into vacuum leads to even lower concentrations of hydrogen peroxide (see, e.g., *Hydrogen Peroxide*, Schumb, pp. 228-229). The vapor composition of a 30% $H_2O_2$ aqueous solution delivered using a vacuum at 30 mm Hg is predicted to yield approximately half as much hydrogen peroxide as would be expected for the same solution delivered at atmospheric pressure.

Gas phase delivery of low volatility compounds presents a particularly unique set of problems. One approach is to provide a multi-component liquid source wherein the process chemical is mixed with a more volatile solvent, such as water or an organic solvent (e.g., isopropanol). However, when a multi-component solution is the liquid source to be delivered (e.g., hydrogen peroxide and water), Raoult's Law for multi-component solutions. becomes relevant. According to Raoult's Law, for an idealized two-component solution, the vapor pressure of the solution is equal to the weighted sum of the vapor pressures for a pure solution of each component, where the weights are the mole fractions of each component:

$$P_{tot}=P_a X_a + P_b X_b$$

In the above equation, $P_{tot}$ is the total vapor pressure of the two-component solution, $P_a$ is the vapor pressure of a pure solution of component A, $X_a$ is the mole fraction of component A in the two-component solution, $P_b$ is the vapor pressure of a pure solution of component B, and $X_b$ is the mole fraction of component B in the two-component solution. Therefore, when A and B have different vapor pressures, the relative mole fraction of each component is different in the liquid phase than it is in the vapor phase above the liquid. Specifically, the more volatile component (i.e., the component with the higher vapor pressure) has a higher relative mole fraction in the gas phase than it has in the liquid phase. In addition, because the gas phase of a typical gas delivery device, such as a bubbler, is continuously being swept away by a carrier gas, the composition of the two-component liquid solution, and hence the gaseous head space above the liquid, is dynamic.

Thus, according to Raoult's Law, if a vacuum is pulled on the head space of a multi-component liquid solution or if a traditional bubbler or vaporizer is used to deliver the solution in the gas phase, the more volatile component of the liquid solution will be preferentially removed from the solution as compared to the less volatile component. This limits the concentration of the less volatile component that can be delivered in the gas phase. For instance, if a carrier gas is bubbled through a 30% hydrogen peroxide/water solution, only about 295 ppm of hydrogen peroxide will be delivered, the remainder being all water vapor (about 20,000 ppm) and the carrier gas.

The differential delivery rate that results when a multi-component liquid solution is used as the source of process gases makes challenging repeatable process control. It is difficult to write process recipes around continuously changing mixtures. In addition, controls for measuring a continuously changing ratio of the components of the liquid source are not readily available, and if available, they are costly and difficult to integrate into the process. In addition, certain solutions become hazardous if the relative ratio of the components of the liquid source changes. For example, hydrogen peroxide in water becomes explosive at concentrations over about 75%; and thus, delivering hydrogen peroxide by bubbling a dry gas through an aqueous hydrogen peroxide solution, or evacuating the head space above such solution, can take a safe solution (e.g., 30% $H_2O_2/H_2O$) and convert it to a hazardous material that is over 75% hydrogen peroxide. Therefore, currently available delivery devices and methods are insufficient for consistently, precisely, and safely delivering controlled quantities of process gases in many micro-electronics applications and other critical processes.

There has been recent interest in the use of hydrogen peroxide concentrations above 14 weight %, such as 25 weight % or more, such as 50 weight % or more. Such solutions may include certain stabilizers not otherwise used at lower concentrations. The presence of stabilizers may ultimately degrade or otherwise impair the performance of equipment or materials that come into contact with the stabilizers in applications where the concentrated hydrogen peroxide is used. Additionally, the stabilizers may become undesirably deposited on materials or surfaces intended to be cleaned by the hydrogen peroxide gas in any number of applications or critical processes. Thus, there is a need for methods for purifying such stabilized hydrogen peroxide solutions prior to their use.

BRIEF DESCRIPTION OF THE DRAWINGS

The following figures form part of the present specification and are included to further demonstrate certain aspects and embodiments of the present disclosure. The disclosure may be better understood by reference to one or more of these figures in combination with the description of specific embodiments presented herein.

SUMMARY OF CERTAIN EMBODIMENTS

In one aspect of the invention, a method comprising:
a) providing a solution comprising hydrogen peroxide and one or more cations; and
b) contacting the solution with an ion exchange polymer to produce a purified solution having a reduced content of the one or more cations is provided.

The solution may contain the cations as stabilizers, such as when the solution comprises more than 14 weight % hydrogen peroxide. The method reduces the content of the one or more cations in the solution, thereby reducing or eliminating their possible adverse effects during subsequent processing or use of the solution.

After contacting with the ion exchange polymer, the purified solution may undergo additional processing steps. The additional processing steps may include, for example, forming a vapor from a purified liquid solution through contact with another ion exchange membrane. The additional processing steps may also include, for example, contacting a purified vapor solution with another ion exchange membrane and/or delivering the resulting vapor to a critical process or application.

Also provided in the present disclosure are systems, devices, and apparatuses for delivering a purified hydrogen peroxide solution. The systems, devices, and apparatuses comprise:
a) a solution comprising hydrogen peroxide and one or more cations;
b) an ion exchange polymer in contact with the solution; and
c) a housing configured to contain the solution and the polymer.

In certain embodiments, the solution in the systems and devices is a liquid; in other embodiments, the solution is a vapor. In certain embodiments, the systems and devices further comprise a second ion exchange polymer in contact with the purified liquid solution. In certain embodiments, the systems and devices further comprise one or more flow control devices for delivering hydrogen peroxide vapor to a critical process or application.

Additional embodiments and features are included in the detailed description that follows, and will be readily apparent to those skilled in the art from the description or recognized by practicing the embodiments as described in the specification and claims.

DETAILED DESCRIPTION OF CERTAIN EMBODIMENTS

Various embodiments of the invention will now be explained in greater detail. It is to be understood that both the foregoing general description and the following detailed description are exemplary and explanatory only, and are not restrictive of the invention as claimed. Any discussion of certain embodiments or features serves to illustrate certain exemplary aspects of the invention. The invention is not limited to the embodiments specifically discussed herein.

Unless otherwise indicated, all numbers such as those expressing temperatures, weight percents, concentrations, time periods, dimensions, and values for certain parameters or physical properties used in the specification and claims are to be understood as being modified in all instances by the term "about." It should also be understood that the precise numerical values and ranges used in the specification and claims form additional embodiments of the invention. All measurements are subject to uncertainty and experimental variability.

As used herein, "substantially gas-impermeable membrane" is a broad term, and is to be given its ordinary and customary meaning to a person of ordinary skill in the art (and is not to be limited to a special or customized meaning), and refers without limitation to a membrane that is relatively permeable to some components that may be present in a gaseous or liquid phase, e.g., hydrogen peroxide, but relatively impermeable to other gases such as, but not limited to, hydrogen, nitrogen, oxygen, carbon monoxide, carbon dioxide, hydrogen sulfide, hydrocarbons (e.g., ethylene), volatile acids and bases, refractory compounds, and volatile organic compounds. A substantially gas-impermeable membrane in accordance with the present disclosure can be relatively permeable to other components that may be present in a gaseous or liquid phase, e.g., water, hydrogen peroxide, hydrazine, and the like. Examples of substantially gas-impermeable membranes include NAFION® (E.I. du Pont de Nemours & Co., Wilmington, Del.) and salt derivatives, as well as AQUIVION® (Solvay S.A., Brussels, Belgium) or 3M IONOMER® (3M Co., Minneapolis, Minn.). Gas impermeability can be determined by the "leak rate" of the membrane.

As used herein, "critical process or application" is a broad term, and is to be given its ordinary and customary meaning to a person of ordinary skill in the art (and is not to be limited to a special or customized meaning), and refers without limitation to a process or application in which process control and purity are critical considerations. Examples of critical processes and applications include without limitation microelectronics applications, wafer cleaning, wafer bonding, photoresist stripping, silicon oxidation, surface passivation, photolithography mask cleaning, atomic layer deposition, atomic layer etch, chemical vapor deposition, flat panel displays, disinfection of surfaces contaminated with bacteria, viruses and other biological agents, industrial parts cleaning, pharmaceutical manufacturing, production of nano-materials, power generation and control devices, fuel cells, and power transmission devices.

As used herein, "leak rate" is a broad term, and is to be given its ordinary and customary meaning to a person of ordinary skill in the art (and is not to be limited to a special or customized meaning), and refers without limitation to the mass or moles of a particular gas that penetrates the membrane surface area per unit of time.

As used herein, "ion exchange membrane" is a broad term, and is to be given its ordinary and customary meaning to a person of ordinary skill in the art (and is not to be limited to a special or customized meaning), and refers without limitation to a membrane comprising chemical groups capable of combining with ions or exchanging with ions between the membrane and an external substance. Such chemical groups include, but are not limited to, sulfonic acid, carboxylic acid, sulfonamide, sulfonyl imide, phosphoric acid, phosphinic acid, arsenic groups, selenic groups, phenol groups, and salts thereof. When making modifications to ion-exchange membranes resulting in salts, such salts are referred to herein as "ion-exchange membrane salts." When the ion exchange membrane is a component of a membrane-based vaporizer that operates by transport of a chemical component of a source liquid across the ion exchange membrane to enter a gas phase, the ion exchange membrane can be referred to as an ion exchange "separation" membrane.

As used herein, "relatively constant" is a broad term, and is to be given its ordinary and customary meaning to a person of ordinary skill in the art (and is not to be limited to a special or customized meaning), and refers without limitation to a value that, although it may change with time, does not change so substantially so as to render the value inoperative or substantially less operative. In the context of increasing the concentration of a low volatile component, such as $H_2O_2$, it means maintaining a concentration at sufficiently high levels so as to provide a stable gas delivery of the low volatility component gas for sufficient time to be applied to a critical process or application. For example, maintaining a standard deviation of to within 3% or up to 5% of the mean for an hour would be considered relatively constant.

As used herein, "equilibrium concentration" is a broad term, and is to be given its ordinary and customary meaning to a person of ordinary skill in the art (and is not to be limited to a special or customized meaning), and refers without limitation to the maximum amount of the less volatile component that may be delivered into the gas phase to be used, for example, to decontaminate a material and will be dependent upon temperature and head space pressure. Under such equilibrium conditions, the molar ratio of the less volatile component to the higher volatile component in the gas phase will be equivalent to the molar ratio of the less volatile component to the higher volatile component in the solution phase of the liquid used to replenish the multi-component source liquid. In solutions with multiple components, under such equilibrium conditions in accordance with the present invention, the molar ratio of the less volatile component to the higher volatile components in the gas phase will be equivalent to the molar ratio of the less volatile component to the higher volatile components in the solution phase of the liquid used to replenish the multi-component source liquid.

As used herein, "stable" in the context of the output gas comprising the less volatile component from the multi-component source liquid, such as hydrogen peroxide in the gas-phase at a stable steady state concentration, means an output concentration that does not vary beyond certain parameters such as, for example, by more than 10% in some embodiments and not by more than 5%, 3% or 2% in other embodiments. The term applies once an equilibrium concentration of the less volatile component in the gas phase has been achieved and is being delivered to a critical process or application. The percentages herein are the standard deviation from the mean with respect to the mean of measured gas output.

As used herein, "stable steady state concentration" in the context of the output gas comprising the less volatile component from the multi-component source liquid, means an output that has increased to a concentration that is stable and in equilibrium as those terms are used herein.

As used herein, "gas" means gaseous species that is not a liquid, solid or a plasma as those terms are well understood in the art. Further, a gas is not a mist or a fog as would be generated, for example, by a nebulizer or atomizer. The term further means that there are fewer than 100 particles of liquid from the gas generation source liquid greater than 100 nm in size at standard temperature and pressure conditions in a volume of one liter as measured with a standard condensation nucleation counter. In certain critical application where droplet particles are detrimental, the term gas may preferably means that there are less than 10 particles greater than 100 nm, 50 nm, 25 nm, or 10 nm at standard temperature and pressure conditions in a volume of one liter as measured with a standard condensation nucleation counter available from MSP in Minnesota, Particle Measuring Systems or other readily available commercial instruments. In a multicomponent liquid, such as water and hydrogen peroxide, when volatilized and delivered to a critical process application such as a material to be decontaminated, the hydrogen peroxide is in the gas phase. By comparison, it is possible that water, when volatilized and introduced into a carrier gas, may be either a gas or a vapor.

As used herein, "process gas" is a broad term, and is to be given its ordinary and customary meaning to a person of ordinary skill in the art (and is not to be limited to a special or customized meaning), and refers without limitation to a gas that is used in a critical application process, such as the decontamination of a material or cleaning the surfaces of semiconductors or the chemical modification of semiconductor surfaces to form an oxide, hydroxyl ligand. Similarly, such surfaces may be passivated by the removal of carbon atoms, or reacted with photoresist or photoresist byproducts, or annealing spin-on dielectrics or spin-on silicon based precursors. Exemplary process gases are water, inorganic acids, organic acids, inorganic bases, organic bases, and inorganic and organic solvents. A particular process gas is hydrogen peroxide gas. Another particular process gas includes hydrazine. A process gas "stream" refers to a flow of process gas that may be carried through a pipe, a tube, or other conduit, to a place where the process gas may be used. A process gas stream may include a carrier gas.

As used herein, "carrier gas" is a broad term, and is to be given its ordinary and customary meaning to a person of ordinary skill in the art (and is not to be limited to a special or customized meaning), and refers without limitation to a gas that is used to carry another gas through a process train, which is typically a train of piping. Exemplary carrier gases are nitrogen, argon, hydrogen, oxygen, $CO_2$, clean dry air, room air, helium, or other gases or combinations thereof that are stable at room temperature and atmospheric pressure. A carrier gas may be an inert gas. In one embodiment, the carrier gas is nitrogen. The carrier gas may be solely an inert gas or it may have one or more additional components. A carrier gas may further comprise water, for example. By "dry nitrogen" what is meant is a nitrogen gas substantially free of water. In other embodiments, the carrier gas may be hydrogen, clean dry air, oxygen, ozone, or combinations thereof. In some embodiments, the carrier gas may be substantially free of water. In certain embodiments, the carrier gas is not passed through a humidifier. In one embodiment, the carrier gas contains an inert gas and water. As used herein, when water is identified as a component of the gas, unless otherwise provided, it is understood to be water in the gas phase.

As used herein, "substantially dry carrier gas" means gas, or a particular kind of gas if in relation to clean dry air or nitrogen for example, that is dehumidified by methods known in the art reduce moisture in a gas so as to deliver a gas that is as dry as practicable. Such methods include, but are not limited to using gas purifiers such as those available from commercial manufacturers.

As used herein, "pre-loaded carrier gas" is a broad term, and is to be given its ordinary and customary meaning to a person of ordinary skill in the art (and is not to be limited to a special or customized meaning), and refers without limitation to a carrier gas containing an amount of one or more component(s) of a source liquid. In one embodiment, the pre-loaded carrier gas contains an inert gas and water. In another embodiment, the pre-loaded carrier gas comprises one or more of nitrogen, argon, hydrogen, oxygen, $CO_2$, clean dry air, helium, or other gases that are stable at room temperature and atmospheric pressure and water. A pre-loaded carrier gas is also considered a carrier gas.

As used herein, "undersaturated" means, in the context of a gas, such as a carrier gas or carrier gas, that the partial pressure of the gas is less than the maximum partial pressure for that gas in the head space or the carrier gas or carrier gas for the given temperature and pressure. The term undersaturated applies at a point specific point in time. The carrier gas may be saturated for a specific temperature and pressure and later be modified by reducing the pressure or increasing the temperature such that the head space or carrier gas is now undersaturated. As used herein, "oversaturated" means, in the context of a gas, such as a carrier gas or carrier gas, that the that the partial pressure of the gas is greater than the maximum partial pressure for that gas in the head space or the carrier gas or carrier gas for the given temperature and pressure. In some embodiments of the invention, the gas stream delivered to the critical process application is at a higher partial pressure of the component less volatile than water than the partial pressure of that component from the multi-component source liquid used to replenish prior to delivery of that liquid.

As used herein, "inert gas" is a broad term, and is to be given its ordinary and customary meaning to a person of ordinary skill in the art (and is not to be limited to a special or customized meaning), and includes without limitation a gas that is relatively impermeable to the membrane as described herein. In one embodiment, the inert gas comprises one or more of nitrogen, argon, helium, or other noble gases. In another embodiment, the inert gas is nitrogen. In another embodiment, the inert gas is dry nitrogen.

As used herein, "source liquid" is a broad term, and is to be given its ordinary and customary meaning to a person of ordinary skill in the art (and is not to be limited to a special or customized meaning), and generally refers without limitation to a liquid solution that provides the source of a gas through change of phase used in an application or process, specifically a process gas. In certain embodiments, the source liquid directly contacts the ion exchange separation membrane of a membrane-based vaporizer.

As used herein, "replenishment source liquid" is a broad term, and is to be given its ordinary and customary meaning to a person of ordinary skill in the art (and is not to be limited to a special or customized meaning), and refers without limitation to a source liquid used to replenish a system that consumes source liquid. A replenishment source liquid may contain additives or chemical stabilizers, and may be used for refilling a liquid reservoir of a vaporizer apparatus. A commercially obtained 50 weight % stabilized hydrogen peroxide solution that includes sodium stannate, potassium stannate, and zinc stannate is an example of a replenishment source liquid. Notably, the ratio of components in a multi-component liquid serving as the replenishment source liquid may be the same, or may be different from the ratio of components in the source liquid.

As used herein, "purified replenishment source liquid" is a broad term, and is to be given its ordinary and customary meaning to a person of ordinary skill in the art (and is not to be limited to a special or customized meaning), and refers without limitation to a liquid solution prepared by selectively reducing or removing at least one chemical component from a replenishment source liquid. For example, a purified replenishment source liquid may include a reduced amount of a chemical agent found in a replenishment source liquid, where that chemical agent binds to the material of an ion exchange separation membrane by ionic or absorptive interaction.

As used herein, "head space" is a broad term, and is to be given its ordinary and customary meaning to a person of ordinary skill in the art (and is not to be limited to a special or customized meaning), and refers without limitation to a volume of gas in fluid contact with a source liquid that provides at least a portion of the gas contained in the head space.

As used herein, "vaporizer" is a broad term, and is to be given its ordinary and customary meaning to a person of ordinary skill in the art (and is not to be limited to a special or customized meaning), and refers without limitation to a device that generates a gas, a vapor, or a mist from a starting source liquid. Nebulizers and bubblers are embraced by the term, since these devices produce a vapor from a source liquid. In a specific embodiment represented by a membrane-based vaporizer, which generates a gas starting from a source liquid, there is a headspace, a carrier gas inlet, a carrier gas outlet, and a permeable or selectively permeable barrier (e.g., an ion exchange membrane) separating the head space from the source liquid where the source liquid changes phase and may be used as a process gas. The vaporizer may optionally include a heater to control the temperature of the source liquid and/or vapor. The gas generated from the source liquid by energy supplied by a heat source is swept away by the carrier gas. In certain embodiments the carrier gas is saturated. In other embodiments the carrier gas is not saturated.

As used herein, the term "vaporizes" refers to a procedure that employs a vaporizer (i.e., a device), and that generates a gas, a vapor, or a mist starting from a source liquid.

One embodiment of the invention includes a method, which comprises:
 a) providing a solution comprising hydrogen peroxide and one or more cations; and
 b) contacting the solution with an ion exchange polymer to produce a purified solution having a reduced content of the one or more cations.

In certain embodiments, the ion exchange polymer, whether or not in the form of a membrane, is a polysulfonic acid polymer. In still other embodiments, the ion exchange membrane is a fluorine-containing polymer, e.g., polyvinylidenefluoride, polytetrafluoroethylene (PTFE), ethylene tetrafluoride-propylene hexafluoride copolymers (FEP), ethylene tetrafluoride-perfluoroalkoxyethylene copolymers (PFE), polychlorotrifluoroethylene (PCTFE), ethylene tetrafluorideethylene copolymers (ETFE), polyvinylidene fluoride, polyvinyl fluoride, vinylidene fluoride-trifluorinated ethylene chloride copolymers, vinylidene fluoride-propylene hexafluoride copolymers, vinylidene fluoridepropylene hexafluoride-ethylene tetrafluoride terpolymers, ethylene tetrafluorideporopylene rubber, and fluorinated thermoplastic elastomers. In another embodiment, the ion exchange polymer is a perfluorinated polysulfonic acid polymer. Other exemplary perfluorinated ionomers include, but are not limited to, perfluorosulfonic acid/tetrafluoroethylene copolymers ("PFSA-TFE copolymer") and perfluorocarboxylic acid/tetrafluoroethylene copolymer ("PFCA-TFE copolymer"). In other embodiments the ion exchange polymer is a perfluorinated polysulfonic acid polymer in the form of a membrane such as NAFION® or a hydrolyzed version of a sulfonyl fluoride perfluorinated membrane.

Preferably, the ion exchange separation membrane of a membrane-based vaporizer is a resin. In one embodiment, the ion exchange membrane is a fluorine-containing polymer. The ion exchange membrane is preferably a perfluorinated ionomer comprising a copolymer of ethylene and a vinyl monomer containing an acid group or salts thereof. These membranes are commercially available under the trade names NAFION® (E.I. du Pont de Nemours & Co., Wilmington, Del.), FLEMION® (Asahi Glass Company, Ltd., Tokyo, Japan), and ACIPLEX® (Asahi Kasei Chemicals Company, Tokyo, Japan). 3M IONOMER (3M Company, Minneapolis, Minn.) or AQUIVION® (Solvay S.A., Brussels, Belgium) could also be used.

In certain embodiments, a single peak molecular weight is preferred. In certain embodiments, bimodal or multimodal molecular weights are preferred. Preferably, the copolymer is between approximately 500EW and approximately 2000EW. In certain embodiments, the ion exchange membrane may contain either a single copolymer or combinations of copolymers. In certain embodiments, the polymer can be in any configuration, including, but not limited to, block, tapered, random, linear, and others. PFCA-TFE copolymers contain a tetrafluoroethylene ("TFE") "backbone," to which the perfluorocarboxylic acid (perfluoro(4-methyl-3,6-dioxa-7-octene-1-carboxylic acid)) groups are attached. The acid groups can be converted to salt form by a pretreatment with a suitable base. A PFSA-TFE copolymer contains a TFE "backbone," to which perfluorosulfonic acid (perfluoro(4-methyl-3,6-dioxa-7-octene-1-sulfonic acid)) groups are attached. There are between one and six perfluorosulfonic acid groups per six TFE backbone units. Copolymers are normally classified by equivalent weight ("EW"), or by grams of polymer per mole of functional group.

The pretreatment methods are well known in the art, and can be performed according to the manufacturer's recommendation. Depending on the nature of the liquid to be vaporized, pretreatment conditions can be adjusted to optimize the membrane. Examples of pretreatment conditions that can be adjusted and include, but are not limited to, selection of base, solvents, temperature, soaking in a hydrogen peroxide solution, and other parameters that would be known to a person of skill in the art.

Hydrophilicity can be adjusted by cross-linking with a hydrophilic agent or by co-casting. In such embodiments where hydrophilicity is adjusted by cross-linking with a hydrophilic agent or by co-casting, the polymer already includes cross-linkable groups, or is functionalized to include cross-linkable groups. Other pretreatments without modifying surface chemistry can be employed. In another embodiment, the polymer can be impregnated with inorganic oxides. This impregnation can improve thermal stability by 5° C.-120° C. This can also increase water transport rate properties by 2%-40%.

Preferably, the membrane suppresses the diffusion of gases and other contaminants, such as particles, aerosols, viruses, bacteria, and prions. Preferably, the thickness of the membrane is between 0.5 microns and 2,000 microns. The leak rate is measured by monitoring the pressure in an isolated static system. An example of a leak rate is $10^{-9}$ cm$^3$/cm$^2$/s for nitrogen at standard temperature and pressure. Leak rates can be as high as $10^{-3}$ cm$^3$/cm$^2$/s at standard temperature and pressure or as low as $10^{-11}$ cm$^3$/cm$^2$/s for a specific gas.

In one method of generating a gas from a source liquid, the source liquid is contacted to a first side of a substantially gas impermeable membrane and the gas generated is received on the second side of the substantially gas impermeable membrane. In certain embodiments, the first and second sides of the substantially gas impermeable membrane have a flat form, wherein the membrane is a sheet. In other embodiments, the membrane can also be in a tubular or cylindrical form, wherein one surface forms the inner potion of a tube, and the opposing surface forms the outer portion of the tube. In all embodiments, the membrane can take any form, provided that a first surface and an opposing second surface sandwich a bulk of membrane material.

Certain properties of the membrane can be adjusted, depending on the process conditions, the nature of the gas being generated, and other factors. Such adjustable properties can include: the physical form of the membrane, the configuration of the membrane, the fabrication method of the membrane, the presence or absence of a support layer of the membrane, the presence or absence of an active layer of the membrane, as well as other properties not listed here.

When the membrane is thin, it is preferred to give the membrane some means of mechanical support. Thicker membranes can be used without such support.

In certain embodiments, the surface area of the membrane can be adjusted based on the volume of gas to be generated. Either a higher or lower surface area can be desirable, depending on the chemistry of membrane. In an alternative embodiment, the resin comprises a composite or mixture of polymers. This composite or mixture of polymers can comprise two or more layers. The layers can have the same or different properties as one another. A layer can provide support to filtration.

In certain embodiments, it is generally preferable for the membranes to be in fiber form, rather than in sheet form, due to the ability to provide greater exposed membrane surface area in a fixed volume when fibers are employed.

The solution may be in liquid or vapor form. When the solution is a liquid, a further embodiment comprises:
 a) providing a solution comprising hydrogen peroxide and one or more cations;
 b) contacting the solution with an ion exchange polymer to produce a purified solution having a reduced content of the one or more cations; and
 c) forming a vapor from the purified liquid solution.

The vapor may be formed in c) through any suitable technique, such as through applying heat.

In another embodiment, the vapor is formed in c) by contacting the purified liquid solution with a substantially gas-impermeable ion exchange membrane such as a perfluorinated polysulfonic acid polymer membrane. Such a technique is disclosed in WO 2014/014511, titled "Method, System, and Device for Delivery of High Purity Hydrogen Peroxide," the entire contents of which are incorporated by reference herein. The purified liquid solution may, for example, contact a first side of such a membrane to ultimately obtain a vapor emerging from a second side of the membrane. In this instance, the vapor phase and liquid source are separated by a substantially gas-impermeable ion exchange membrane, such as a perfluorinated polysulfonic acid polymer membrane. By using such a membrane, the concentration of hydrogen peroxide in the resultant vapor may be increased relative to the hydrogen peroxide concentration that would be obtained directly from the solution without the use of a membrane.

The ion exchange polymer membrane may be composed of any suitable materials, such as those described above for the ion exchange polymer. The membrane may also have any suitable structure. For example, the first and second sides can have the form of substantially flat, opposing planar areas, where the membrane is a sheet. Membranes can also be provided in tubular or cylindrical form where one surface forms the inner position of the tube and an opposing surface lies on the outer surface. The membrane can take any form, so long as the first surface and an opposing second surface sandwich a bulk of the membrane material. Multiple membranes may also be arranged in the form of an assembly, for example, with several membranes configured as lumens inserted at each end into holes of a collector plate.

Depending on the processing conditions, nature of the solution, volume of the solution's vapor to be generated, and other factors, the properties of the membrane can be adjusted. Properties include, but are not limited to physical form (e.g., thickness, surface area, shape, length and width for sheet form, diameter if in fiber form), configuration (flat sheet(s), spiral or rolled sheet(s), folded or crimped sheet(s), fiber array(s)), fabrication method (e.g., extrusion, casting from solution), presence or absence of a support layer, presence or absence of an active layer (e.g., a porous prefilter to adsorb particles of a particular size, a reactive prefilter to remove impurities via chemical reaction or bonding), and the like. It is generally preferred that the membrane be from about 0.5 microns in thickness or less to 2000 microns in thickness or more, preferably from about 1, 5, 10, 25, 50, 100, 200, 300, 400, or 500 microns to about 600, 700, 800, 900, 1000, 1100, 1200, 1300, 1400, 1500, 1600, 1700, 1800, or 1900 microns. When thinner membranes are employed, it can be desirable to provide mechanical support to the membrane (e.g., by employing a supporting membrane, a screen or mesh, or other supporting structure), whereas thicker membranes may be suitable for use without a support. The surface area can be selected based on the mass of vapor to be produced.

In embodiments where a vapor has been formed in c), such as through application of heat to the liquid solution, a further embodiment comprises:

One embodiment of the invention includes a method, which comprises:
 a) providing a solution comprising hydrogen peroxide and one or more cations;
 b) contacting the solution with an ion exchange polymer to produce a purified solution having a reduced content of the one or more cations;
 c) forming a vapor from the purified liquid solution; and
 d) passing the vapor through an ion exchange polymer membrane, such as a perfluorinated polysulfonic acid polymer membrane, an example of such a membrane being NAFION® or hydrolyzed versions of sulfonyl fluoride perfluorinated membranes.

Step d) may utilize the membrane to remove contaminants from the vapor stream, and the membrane may have any of the structural characteristics described above.

Methods, systems, and devices for delivering hydrogen peroxide vapor with a perfluorinated ion exchange membrane are disclosed in PCT Publication WO 2014/165637, titled "Delivery of a High Concentration Hydrogen Peroxide Gas Stream," filed on Apr. 3, 2014, the entire contents of which is hereby incorporated by reference herein, In addition, analogous methods, systems, and devices are disclosed in U.S. Provisional Application No. 61/824,127, titled "Delivery of a High Concentration Hydrogen Peroxide Gas Stream," filed on May 16, 2013; and U.S. Provisional Application No. 61/809,256, titled "Delivery of a High Concentration Hydrogen Peroxide Gas Stream," filed on Apr. 5, 2013. The entire contents of those applications are also hereby incorporated by reference herein.

In some embodiments, the solution in a) is in the form of a vapor. Similarly to the vapor that can be formed in c), this purified vapor may also be passed through an ion exchange polymer membrane, such as a perfluorinated polysulfonic acid polymer membrane, for example, for the purpose of removing contaminants.

The purified vapor resulting from any of the embodiments discussed above may be delivered to any suitable critical process or application. Such critical processes and applications include, without limitation, microelectronics applications, wafer cleaning, wafer bonding, photoresist stripping, silicon oxidation, surface passivation, photolithography mask cleaning, atomic layer deposition, chemical vapor deposition, flat panel displays, disinfection of surfaces contaminated with bacteria, viruses and other biological agents, industrial parts cleaning, pharmaceutical manufacturing, production of nano-materials, power generation and control devices, fuel cells, and power transmission devices.

Another embodiment of the invention includes a method, which comprises:
a) providing a solution comprising hydrogen peroxide and one or more cations;
b) contacting the solution with an ion exchange polymer to produce a purified solution having a reduced content of the one or more cations;
c) forming a vapor from the purified liquid solution;
d) passing the vapor through an ion exchange polymer membrane, such as a perfluorinated polysulfonic acid polymer membrane, an example of such a membrane being NAFION® or hydrolyzed versions of sulfonyl fluoride perfluorinated membranes; and
e) delivering the vapor resulting from step c) or step d) to a critical process or application.

The solution in step a), whether liquid or vapor, may comprise water in any suitable amount or may be substantially free of water. In some embodiments the solution is substantially free of water, meaning that water is not purposefully added to the solution such as through a dedicated source of water. The phrase "substantially free of water" does not exclude the incidental water content that may be present in the sources of other solution components, such as may be present in the source of hydrogen peroxide. The phrase "substantially free of water" similarly does not exclude incidental water content that may arise from decomposition of hydrogen peroxide on system components, or that may enter an enclosure of the solution from the outside environment. In some embodiments, the solution comprises 2% or less by weight of water, or 1.5 weight % or less, or 1.0 weight % or less, or 0.5 weight % or less of water.

In addition to hydrogen peroxide, the solution may further comprise a non-aqueous excipient. Example non-aqueous excipients include, but are not limited to, alcohols, including polyalcohols, phenols, lactones, amides, esters, including polyesters, ethers, carboxylic acids, including polycarboxylic acids, sulfonic acids, sulfinic acids, phosphonic acids, phosphinic acids, organic solvents, inorganic solvents, aromatic compounds, polyaromatic compounds, heterocyclic compounds, including polyheterocyclic compounds, fluorinated ethers, fluorinated alcohols, fluorinated sulfonic acids, fluorinated carboxylic acids, including polycarboxylic acids, fluorinated phosphonic acids, deep eutectic solvents, and combinations thereof.

The solution in step a) comprises one or more cations. The cations may be present, for example, as stabilizers for the hydrogen peroxide solution, such as for a solution comprising more than 14 weight % hydrogen peroxide, such as 25 weight % or more, such as 50 weight % or more.

In some embodiments, the one or more cations comprise one or more metal cations. Example metal cations include sodium, potassium, barium, calcium, copper, magnesium, manganese, nickel and zinc cations. In one embodiment, the one or more metal cations comprise a sodium, potassium, magnesium, copper or calcium cation; in another embodiment the one or more metal cations comprise a magnesium or calcium cation; and in a further embodiment the one or more metal cations comprise a copper cation. In an additional embodiment, the one or more metal cations comprise a sodium or potassium cation, such as can be derived from sodium stannate or potassium stannate, respectively.

The metal cations may be present in any suitable amount in the solution, whether used as stabilizers or for other purposes. For instance, the solution may comprise 15 ppm or less by weight of metal cations, or 10 ppm or more by weight of metal cations.

The solution also comprises hydrogen peroxide in any suitable amount. For example, the solution may comprise hydrogen peroxide in an amount of 10 weight % or more, 15 weight % or more, 20 weight % or more, 25 weight % or more, 30 weight % or more, 35 weight or more, 40 weight % or more, 45 weight % or more, 50 weight % or more, 55 weight % or more, 60 weight % or more, 65 weight % or more, or 70 weight % or more.

The ion exchange polymer in a) may be in the form of any shape or structure. For example, it may be in the form of a membrane having any of the structural characteristics of the ion exchange membranes discussed previously. The ion exchange polymer in a) could also be in the form of, for example, a bead or pellet.

Perfluorinated polysulfonic polymers are ion exchange polymers such as those made when hydrolyzing sulfonyl fluoride perfluorinated membranes to obtain a perfluorinated polysulfonic acid membrane. Examples of such polymers are disclosed in WO 2014/014511, with those examples being incorporated by reference herein. NAFION® is an example of a perfluorinated sulfonic acid membrane. The ion exchange polymer (such as a perfluorinated polysulfonic polymer) in a), and the ion exchange polymer membranes (such as perfluorinated polysulfonic polymer membranes) described previously, may have identical compositions or may be made of different variants of ion exchange material. The ion exchange polymer (such as perfluorinated polysulfonic polymer) material, whether in the form of a membrane or not, includes such a material that has been chemically treated e.g., with an acid, base, or salt to modify its reactivity. For example, in certain embodiments, the NAFION® material, whether in the form of a membrane or not, may be treated in a way to form, e.g., the ammonium species.

The solution is contacted with the ion exchange polymer in step b) to produce a solution having a reduced content of the one or more cations.

The phrase "reduced content of the one or more cations" refers to a reduced concentration of at least one cation in the solution after contact with the polymer compared to the concentration of that cation before contact with the polymer. The phrase "reduced content of the one or more cations" does not require complete removal of any cation from the solution. The phrase "reduced content of the one or more "cations" also does not require a reduction in the concentration of several, most or all cations in the solution. In some exemplary embodiments, however, contact of the solution with the polymer reduces the content of at least two, at least three, at least four, or at least five cations in the solution.

Some embodiments therefore comprise contacting the solution with the ion exchange polymer under conditions sufficient to remove 70 weight % or more of at least one cation from the solution. Exemplary cations in this embodiment include sodium, potassium, barium, calcium, copper, magnesium, manganese, nickel and zinc cations.

Another embodiment comprises contacting the solution with the ion exchange polymer under conditions sufficient to remove 80 weight % or more of at least one cation from the solution. Exemplary cations in this embodiment include sodium, potassium, barium, calcium, magnesium, manganese, nickel and zinc cations.

Another embodiment comprises contacting the solution with the ion exchange polymer under conditions sufficient to remove 90 weight % or more of at least one cation from the solution. Exemplary cations in this embodiment include potassium, barium, calcium, magnesium and manganese cations.

A further embodiment comprises contacting the solution with the ion exchange polymer under conditions sufficient to remove 50 weight % or more, or 60 weight % or more of the combined total of all cations, or 50 weight % or more, or 60 weight % or more of the combined total of all metal cations, from the solution.

The solution may be contacted with the ion exchange polymer using any suitable technique. For instance, the solution may be directed to flow over a surface of the polymer, such as by passing from an inlet end to an outlet end of an enclosure containing the polymer. The solution may also contact the polymer by positioning the polymer in an enclosure that contains a volume of the solution that is either static or in fluid motion. Thus, in one embodiment contacting step b) may comprise passing the solution through a packed bed comprising the ion exchange polymer. In another embodiment contacting step b) comprises placing the ion exchange polymer in a liquid solution.

The solution may contact the ion exchange polymer under any conditions sufficient to reduce the content of the one or more cations. For instance, the solution may contact the polymer for a cumulative time of at least 5 seconds, at least 10 seconds, at least 30 seconds, at least 1 minute, at least 5 minutes, at least 10 minutes, at least 15 minutes, at least 30 minutes, at least 45 minutes, at least 1 hour, at least 2 hours, or at least 3 hours. The contact may also take place at any appropriate temperature, such as at room temperature (22° C.).

The present disclosure also includes a vaporizer device or apparatus, and analogous systems, for delivering purified hydrogen peroxide vapor. The systems, devices, and apparatuses comprise:
  a) a solution comprising hydrogen peroxide and one or more cations;
  b) an ion exchange polymer in contact with the solution; and
  c) a housing configured to contain the solution and the polymer.

In certain embodiments, the vaporizer contains the membranes which are preferably fixed in a module or other suitable apparatus. In embodiments in which the membranes are in fiber form, preferably the membranes are arranged in cylindrical arrays or bundles. In other embodiments, other configurations can be employed, such as square, triangular, irregular, or other configurations. The membrane module preferably includes a plurality of hollow membrane fibers each of which extend longitudinally between, and are mounted at each end to, a respective header. In other embodiments, other configurations are contemplated, such as looped fibers wherein both ends are secured in a single header, among other configurations. Preferably, the fibers can be taut or slack, close or loosely packed formation, or spaced apart. The fibers preferably have a packing density of from 5% or less to about 95% or more, or any density in between those two values. The fibers may optionally be partitioned into a certain number of bundles in order to form a space or spaces therein between. Optionally, a single bundle of fibers may be employed.

In some embodiments, it is preferred to maintain some spacing in between the fibers to facilitate circulation of the source liquid (e.g., the purified replenishment source liquid). Optionally, a fiber bundle can be protected by a module support screen. Optionally, casing can provide support to a header or headers. Optionally, clips or rings can be employed to bind the fiber bundle. Preferably, materials employed in the header and any supports or casing are selected such that these materials are able to tolerate elevated temperature and pressure conditions and will resist reacting with or contaminating any gas generated. In some certain embodiments, one or more membrane module may be arranged into a cassette or battery, each cassette or battery being provided with a source liquid, pumps, valves, and instrumentation.

In some embodiments carrier gas enters from the lower header and exits from the upper header. In other embodiments the carrier gas enter from above and exits from the lower header. In each case gas generated from the source liquid permeates the membrane is swept away by carrier gas.

The carrier gas may be saturated, oversaturated, or understaturated with the gas generated by the source liquid.

In certain embodiments the vaporizer contains level sensors, commercially available from Gems Sensors & Controls, Inc., Plainville, Conn., Any person of ordinary skill in the art recognizes the use of level sensors in the embodiments of the invention.

In certain embodiments the vaporizer contains thermal sensors, commercially available from Omega Engineering, Inc., Stamford, Conn. Any person of ordinary skill in the art recognizes the use of thermal sensors in the embodiments of the invention.

In certain embodiments the vaporizer contains over temperature sensors, commercially available from Omega Engineering, Inc., Stamford, Conn. Any person of ordinary skill in the art recognizes the use of temperature sensors in the embodiments of the invention.

In certain embodiments the vaporizer contains a drain valve, commercially available from BioChem Fluidics, Inc., Boonton, N.J. Any person of ordinary skill in the art recognizes the use of a drain valve in the embodiments of the invention.

In certain embodiments the vaporizer contains a replenishment vessel, commercially available from BioChem Fluidics, Inc, Boonton, N.J. Any person of ordinary skill in the art recognizes the use of a replenishment vessel in the embodiments of the invention.

In certain embodiments, gas generated from a source liquid can be delivered at subatmospheric pressures. Delivery at sub-atmospheric pressures is desirable in many applications, such as atomic layer deposition. Sub-atmospheric pressures can be achieved with downstream vacuum pumps.

In certain embodiments, the device comprises a primary pump on the permeate side, and a second pump connected to the source liquid side. In these embodiments, the vapor pressure differential or downstream pressure can be managed by adjusting the power input to the vaporizer, amount of carrier gas flow rate, carrier gas pressure, pressure drop between the liquid to the permeate side, or downstream venting.

Once choke flow is reached across the membrane or on the permeate side of the vaporizer, further lowering of pressure on the permeate side of the vaporizer no longer increases the permeation rate across the membrane. Only by increasing the vapor pressure of the source liquid by adding power through the heater to the vaporizer will increase permeation of the gas generated by the source liquid increase.

In one embodiment the power supplied to the vaporizer is through heating the outside of the vaporizer with electrical heaters. One skilled in the art could apply energy through other method, such as steam, transfer liquids, ambient heat, heating of the carrier gas, and other techniques.

Figure 1:
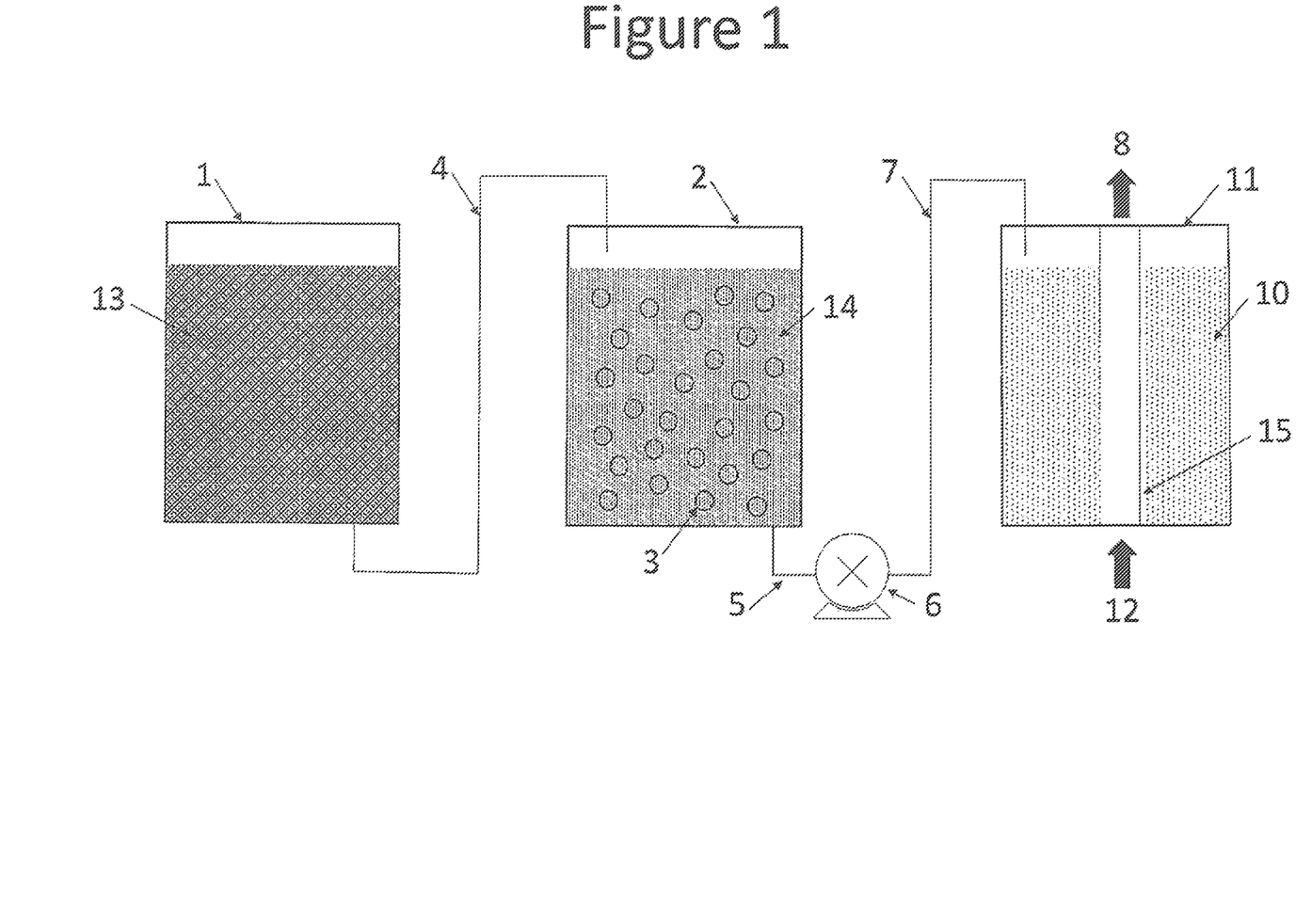
FIG. 1 schematically illustrates purification of replenishment source liquid for a vaporizer. The arrangement of various components of an apparatus that holds and transports different source liquids in accordance with the invention is shown in the diagram.

FIG. 1 illustrates the relationship between various source liquids, purification media, and a vaporizer in accordance with the invention. A supply of replenishment source liquid 13 is stored in replenishment source liquid container 1 (e.g., a first container). Fluid connection 4 facilitates transfer of replenishment source liquid 13 to purification replenishment source liquid container 2 (e.g., a second container). Replenishment source liquid 13 can be transferred from replenishment source liquid container 1 to purification replenishment source liquid container 2 by any convenient means, including a pump, pressurized gas, or gravity feed. Inside purification replenishment source liquid container 2 is purification material 3, which contacts replenishment source liquid 13 and converts it to purified replenishment source liquid 14. In a preferred embodiment, purification material 3 is in the form of a membrane. Purification material 3 preferably includes a perfluorinated ionomer (e.g., a PTSA-TFA copolymer) with high surface area, and can be a NAFION® PTSA-TFA copolymer membrane. Purified replenishment source liquid 14 is transported via fluid connection 5 to pump 6, and then through fluid line 7 to vaporizer 11. A preferred type of pump is a diaphragm pump, as may be obtained from Bio-Chem Fluidics (Wildomar, Calif.). Many other pumps, as well as pressurized transfer or gravity feed systems also may be used for transporting purified replenishment source liquid 14 from purification replenishment source liquid container 2 to vaporizer 11. The vaporizer may be a flash vaporizer, a nebulizer, a bubbler, or more preferably a membrane-based vaporizer. Purified replenishment source liquid 14 is added to source liquid 10, which is contained in vaporizer 11. Carrier gas 12 enters vaporizer 11. In some embodiments, carrier gas 12 may enter vaporizer 11 as bubbles (e.g., through a sparger).

As illustrated in the diagram, and in the preferred case of a membrane-based vaporizer, carrier gas 12 enters through hollow fiber ion exchange separation membrane 15. The membrane is preferably made from an ion exchange membrane, and is preferably made from the same material as purification material 3. For example, both purification material 3 and hollow fiber ion exchange separation membrane 15 can be made of an ionic fluoropolymer such as NAFION® ion exchange membrane. Source liquid 10 vaporizes across hollow fiber ion exchange separation membrane 15, and then is swept away by a flow of carrier gas 12. Process gas stream 8 exits the vaporizer as a mixture of a volatile chemical component of vaporized source liquid 10 and carrier gas 12.

EXAMPLES

Materials used in the examples: 50 weight % (w %) stabilized hydrogen peroxide (Sigma Aldrich), NAFION® Membrane 1100EW, 0.1 N NaOH solution, 1 weight % bromothymol blue, Sodium Sulfate (ACS grade), DI water, Hot/Stir Plate, Stir bar, 500 mL and 100 mL beakers, Timer, 10-100 μL pipette, Analytical Scale (±0.001 g), and Ceramic Scissors.

Example 1

NAFION® Based Purification of Peroxide Stabilizer Test Procedures

The following five tests outlined below were conducted:
Test #1: Titration of NAFION® Lumen Control 1
Titrate a 1.000 g sample of NAFION® following Test #6 to determine the relative acid conversion of stock NAFION®
Test #2: Titration of NAFION® Lumen Control 2
Titrate a 1.000 g sample of NAFION® following the Acid Titration Procedure to determine the relative acid conversion of stock NAFION®
Test #3: Purification of 50 w % Peroxide Using Excess NAFION®
Add an excess amount of NAFION®, 3.000 g, to 50 ml of 50 w % peroxide solution in a 100 ml beaker
Let the NAFION® soak in solution at room temperature (22° C.) for one hour
Remove the lumen from the peroxide solution and rinse with DI water for 2 minutes
Dry NAFION® under de-ionizer fan for 2 hours
Weigh two 1.000 g samples and titrate each sample following Test #6
Results identified as 3a and 3b respectively
Test #4: NAFION® Purification Efficiency Test
45 ml of the purified 50 w % peroxide solution from Test 3 and +1.000 g of NAFION® are placed in a 100 mL beaker
Let the NAFION® soak in solution at room temperature (22° C.) for one hour
Remove the lumen from the peroxide solution and rinse with DI water for 2 minutes
Dry NAFION® under de-ionizer fan for 2 hours
Titrate the 1.000 g sample following Test #6
Test #5: Excess 50 w % Peroxide Purification Test
A 1.000 g sample of NAFION® is added to 350 ml of stabilized 50 w % hydrogen peroxide
Let the NAFION® soak in solution at 50° C. for one hour
Remove the lumen from the peroxide solution and rinse with DI water for 2 minutes
Dry NAFION® under de-ionizer fan for 2 hours
Titrate the 1.000 g sample following Test #6
Test #6: Acid Titration Procedure
Prepare 0.1 M KOH solution
Cut 1.0 gram sample NAFION® into ½ inch sections, and place in 50 ml of DI water in a 500 ml beaker
Add 2.0 g $K_2SO_4$ to beaker, and 3 drops of bromothymol blue to beaker
Place beaker on a hot plate with a stir bar, heating to approximately 40-50° C.
Add drop wise 0.1 M KOH to solution until solution turns blue
Calculate % converted based upon an EW of 1100

$$\% \text{ Converted} = \frac{\frac{(KOH \text{ mols added})}{(\text{Dry Mass } NAFION\text{®})g}}{(1100 \text{ g/mol})} * 100$$

Example 2

Trace Metal Analysis of Stock and Purified Stabilized 50 w % Hydrogen Peroxide A quantitative analysis was run on the 50 w % peroxide solution itself 100 mL of 50 w % stabilized peroxide was purified with 6.016 g of NAFION® for 2.25 hours at 22° C. The mass of NAFION® added to the 100 mL solution had six times the amount of sulfonic acid sites required to purify this volume of solution based on the $5.88 \times 10^{-3}$ mol/L stabilizer concentration determined by titrations 3a and 3b.

Test Results. Table 1 below provides the test conditions and titration results for the experiments.

TABLE 1

Test Conditions and Titration Results

| Test# | NAFION ® Pre-Treatment | Sample mass (g) | Titration Sample mass (g) | Volume of 0.1N NaOH (ml) | Acid Conversion (%) |
|---|---|---|---|---|---|
| 1 | none, control | 0.781 | 0.781 | 6.9 | 97.2 |
| 2 | none, control | 1.124 | 1.124 | 10.1 | 98.8 |
| 3 | 50 ml of 50 w % stabilized H202, 1 hr soak at 22° C. | 3.049 | | titrated 2 smaller samples 3a and 3b | 87.4 |
| 3a | sample removed from test 3 solution | | 1.018 | 8.1 | 87.5 |
| 3b | sample removed from test 3 solution | | 1.16 | 9.2 | 87.2 |
| 4 | Used 45 ml of test 3 solution after removing stabilizers with 3.049 g of NAFION ®, 1 hr soak at 22° C. | 1.04 | 0.9 | 7.9 | 96.6 |
| 5 | 350 ml of 50 w % stabilized H202, 1 hr soak at 50° C. | 1.158 | 1.158 | 0.4 | 3.799654577 |

Table 2 provides the trace metal ion analysis of stock and purified stabilized 50 w % hydrogen peroxide.

TABLE 2

Trace Metal Ion Analysis of Stock and Purified Stabilized 50 w % Hydrogen Peroxide

| Metal Ion Species | RL (ppb (ng/g)) | Stock 50 w % Hydrogen Peroxide Metal Ion Concentration (ppb) | Purified 50 w % Hydrogen Peroxide Metal Ion Concentration (ppb) | % Removed |
|---|---|---|---|---|
| Aluminum (Al) | 0.1 | 73 | 81 | −11.0 |
| Antimony (Sb) | 0.1 | 7.8 | 10 | −28.2 |
| Arsenic (As) | 0.1 | 0.4 | 0.6 | −50.0 |
| Barium (Ba) | 0.1 | 2.2 | 0.2 | 90.9 |
| Beryllium (Be) | 0.1 | * | * | * |
| Boron (B) | 0.1 | 24 | 47 | −95.8 |
| Cadmium (Cd) | 0.1 | 1300 | 1400 | −7.7 |
| Calcium (Ca) | 0.1 | 42 | 1.3 | 96.9 |
| Chromium (Cr) | 0.1 | 24 | 21 | 12.5 |
| Cobalt (Co) | 0.1 | 0.3 | * | * |
| Copper (Cu) | 0.1 | 4.6 | 1 | 78.3 |
| Gallium (Ga) | 0.1 | * | * | * |
| Germanium (Ge) | 0.1 | * | * | * |
| Gold (Au) | 0.5 | * | * | * |
| Iron (Fe) | 0.1 | 53 | 59 | −11.3 |
| Lead (Pb) | 0.1 | 0.4 | 0.3 | 25.0 |
| Lithium (Li) | 0.1 | * | * | * |
| Magnesium (Mg) | 0.1 | 21 | 0.3 | 98.6 |
| Manganese (Mn) | 0.1 | 9.7 | 0.6 | 93.8 |
| Molybdenum (Mo) | 0.1 | 1.8 | 2.1 | −16.7 |
| Nickel (Ni) | 0.1 | 12 | 2.3 | 80.8 |
| Potassium (K) | 0.1 | 2700 | 250 | 90.7 |
| Silver (Ag) | 0.1 | * | * | * |
| Sodium (Na) | 0.1 | 7300 | 1200 | 83.6 |
| Strontium (Sr) | 0.1 | 0.4 | * | * |
| Tin (Sn) | 0.1 | 2300 | 2300 | 0.0 |
| Titanium (Ti) | 0.1 | 2.3 | 2 | 13.0 |

TABLE 2-continued

Trace Metal Ion Analysis of Stock and Purified
Stabilized 50 w % Hydrogen Peroxide

| Metal Ion Species | RL (ppb (ng/g)) | Stock 50 w % Hydrogen Peroxide Metal Ion Concentration (ppb) | Purified 50 w % Hydrogen Peroxide Metal Ion Concentration (ppb) | % Removed |
|---|---|---|---|---|
| Vanadium (V) | 0.1 | 0.1 | 0.7 | −600.0 |
| Zinc (Zn) | 0.1 | 18 | 2.4 | 86.7 |
| Zirconium (Zr) | 0.1 | 0.1 | 0.2 | −100.0 |
| TOTAL | * | 13897.1 | 5382 | 61.3 |

Test 1 and test 2 results determined that the NAFION® used in all tests during this experiment has a starting acid conversion of 98.0±1.0%. Reduction from 98% acid conversion in all NAFION® samples after exposure to the test conditions 3-6 will be used to calculate the moles of ionic stabilizers that were removed per volume of stabilized 50 w % peroxide solution.

Test 3 used an excess amount of NAFION® to pull ionic stabilizers out of the 50 ml of peroxide solution. The 3.049 g mass of NAFION® dropped to an average acid conversion of 87.4±0.2% (average of 3a and 3b titrations). The 10.6% drop in acid conversion on the 3.049 g NAFION® sample corresponds to removing $2.94 \times 10^{-4}$ mol of ions per 50 ml of peroxide solution. Multiplying this value by 20 standardizes the concentration in mol of ions per liter; the concentration of ionic stabilizers in stabilized 50 w % peroxide was found to be $5.88 \times 10^{-3}$ mol/L.

Test 4 conditions evaluated the efficiency of the stabilizer removal achieved by test 3. The 1.040 g sample mass was placed in the purified peroxide solution from test 3. The NAFION® sample lost 1.4% of its acid content. The ionic stabilizer concentration of the purified peroxide after test 3 was calculated from the total moles of sulfonic acid lost from the 1.040 g sample mass; $1.32 \times 10^{-5}$ mol of ions per 45 ml of solution which corresponds to a stabilizer concentration of $2.94 \times 10^{-4}$ mol/L. The single treatment process defined in test 3 was highly effective at removing ionic stabilizers. The ionic stabilizer concentration reduced by 20 fold which corresponds to removing 95.2% of the ionic stabilizers through a single NAFION® treatment process.

Test 5 examined NAFION®'s ability to participate in stabilizer exchange at lower acid conversion levels. This test determined that 5R NAFION® lumens can utilize at least 95% of the membranes ion exchange capacity to remove ionic stabilizers from 50 w % hydrogen peroxide solutions. The 1.158 g sample of NAFION® was converted from 98.0% to 3.8%. Alongside with NAFION®'s excellent resistance to degradation in highly corrosive peroxide solutions, ionic stabilizers were able to fully saturate the membrane deeming NAFION® an efficient resin to use in hydrogen peroxide purification.

The trace metal analysis results of the stock 50 w % peroxide solution determined that 97.8% of the ionic stabilizer content was due to the following metal ions in increasing order: Cd (9.35%), Sn (16.55%), Na (19.43%), and K (52.53%). The total concentration of ionic stabilizers in the stock solution was 13.90 ppm by mass. After the purification with the +6.0 g of NAFION®, the ionic stabilizer concentration was reduced to 5.382 ppm by mass. 61.3% of the ionic stabilizer content was removed using a single ion exchange purification step.

Table 2 highlights the metal ion species that NAFION® was highly effective at removing (Ba, Ca, Cu, Mg, Mn, Ni, K, Na, and Zn). Of the major ionic contributors, NAFION® treatment was able to remove 90.7% of the potassium ions and 83.6% of the sodium ions. The NAFION® membrane removed >93% of the Ca, Mg, and Mn ions, 86.3% of Ni, and >78% of the Cu and Ni ions. Overall, NAFION® membrane was found effective at removing the ionic stabilizer content in stabilized peroxide solutions.

It was further observed that the polymers could be re-acidified in acidic medium such as 10% by weight nitric acid. Other acids may also be used. The ability to re-acidify the polymers indicates that the loss in acid content was due to ionic contamination.

Example 3

Purification of 50 w % Hydrogen Peroxide Using Excess NAFION® Ion Exchange Membrane Example 3 describes procedures used to determine whether the initial contact with the NAFION® ion exchange membrane, described in Example 2, was sufficient to purify the hydrogen peroxide by removal of all ionic stabilizers.

An approximately 3.000 g sample of NAFION® ion exchange membrane was placed in 50 mL of 50 w % stabilized hydrogen peroxide (Sigma Aldrich; St. Louis, Mo.) contained in a 100 mL beaker. The membrane was allowed to soak in the solution at room temperature (22° C.) for one hour. Next, the membrane was removed from the hydrogen peroxide solution and rinsed with deionized water for two minutes. The soaked and rinsed membrane was dried under a deionizer fan for two hours. Two samples of the dried NAFION® ion exchange membrane were titrated according to the procedure given under Example 1. Hydrogen peroxide solution remaining in the beaker following removal of the NAFION® ion exchange membrane (i.e., "purified" hydrogen peroxide) was reserved for use in the procedure of Example 4.

Results of the membrane titration procedure provided insight into the quantity of ionic stabilizers present in the 50 w % stabilized hydrogen peroxide stock solution. Membrane fragments of 1.018 g and 1.16 g required 8.1 mL and 9.2 mL of the strong base to achieve color change of the pH indicator. These results were associated with 87.5% and 87.2% acid conversion, respectively. Thus, using an excess amount of membrane to remove all ionic stabilizers from 50 mL of the solution, the 3.049 g mass of NAFION® ion exchange membrane dropped to an average acid conversion of 87.4±0.2%. The 10.6% drop in acid conversion on the 3.049 g membrane sample corresponds to removing $2.94 \times 10^{-4}$ mol of ions per 50 mL of hydrogen peroxide solution.

Multiplying this value by 20 standardizes the concentration in mol of ions per liter. The concentration of ionic stabilizers in the stabilized 50 w % hydrogen peroxide solution was found to be $5.88 \times 10^{-3}$ mol/L.

Example 4

Purification Efficiency Testing

Example 4 describes procedures used to determine whether the initial contact with the NAFION® ion exchange membrane, described in Example 3, was sufficient to purify the hydrogen peroxide by removal of all ionic stabilizers.

A 45 mL volume of the purified 50 w % hydrogen peroxide solution from Example 3 (i.e., the solution remaining in the beaker following removal of the NAFION® ion exchange membrane) was combined with a fresh 1.000 g sample of NAFION® ion exchange membrane in a 100 mL beaker. The membrane was allowed to soak in the solution at room temperature (22° C.) for one hour. Next, the membrane was removed from the hydrogen peroxide solution and rinsed with deionized water for two minutes. The soaked and rinsed NAFION® ion exchange membrane was dried under a deionizer fan for two hours. An approximately 1.000 g sample of the dried membrane was titrated according to the procedure given under Example 1.

Results from this testing were useful for evaluating the efficiency of stabilizer purification achieved in the procedure of Example 3. After starting with a 1.040 g sample of NAFION® ion exchange membrane in the procedure, a 0.9 g mass of the membrane was titrated and found to require 7.9 mL of the strong base to achieve color change of the pH indicator. This was associated with 96.6% acid conversion, thereby indicating the ion exchange membrane had lost 1.4% of its acid content. The ionic stabilizer concentration of the purified hydrogen peroxide from Example 3 was calculated from the total moles of sulfonic acid lost from the 1.040 g sample mass. Here, $1.32 \times 10^{-5}$ mol of ions per 45 mL of solution corresponded to a stabilizer concentration of $2.94 \times 10^4$ mol/L. The single treatment process described under Example 3 was highly effective at removing ionic stabilizers. Indeed, the ionic stabilizer concentration was reduced by 20 fold, which corresponds to removing 95.2% of the ionic stabilizers by the single treatment.

Example 5

Assessing Capacity of NAFION® to Bind Stabilizers

Example 5 describes procedures used to assess the capacity of the NAFION® ion exchanger sulfonic acid sites can be used to bind and remove stabilizers from a stabilized hydrogen peroxide solution.

Here a small amount of the ion exchange membrane was added to a large amount of stabilized hydrogen peroxide to determine how much of the NAFION® ion exchange membrane sulfonic acid sites could be used to bind and remove stabilizers from the hydrogen peroxide solution. An approximately 1.000 g sample of NAFION® ion exchange membrane was added to 350 mL of stabilized 50 w % hydrogen peroxide solution and allowed to soak at 50° C. for one hour. Next, the membrane was removed from the hydrogen peroxide solution and rinsed with deionized water for two minutes. The soaked and rinsed NAFION® ion exchange membrane was dried under a deionizer fan for two hours. Approximately 1.000 g sample of the dried membrane was titrated according to the procedure given under Example 1.

Results addressed the ability of the NAFION® ion exchange membrane to participate in stabilizer binding at lower acid conversion levels. A 1.158 g sample of the NAFION ion exchange membrane required 0.4 mL of the strong base solution to achieve color change of the pH indicator, thereby demonstrating conversion of 3.8% (from 98.0%). Thus, at least 95% of the ion exchange capacity of the membrane could be used to remove ionic stabilizers from 50 w % hydrogen peroxide solutions. In addition to excellent resistance to degradation in the presence of highly corrosive hydrogen peroxide solutions, ionic stabilizers were able to fully saturate the NAFION® ion exchange membrane. These features make the NAFION® ion exchange membrane an excellent resin for purifying hydrogen peroxide from stabilized hydrogen peroxide solutions.

Example 6

Use of Purified Replenishment Source Liquid Improves Vaporizer Function

Example 6 illustrates how the use of purified replenishment source liquid can improve performance characteristics of a membrane-based vaporizer system. In this illustration, source liquid is purified by first contacting purification media made of the same material as the ion exchange separation membrane of the membrane-based vaporizer.

There initially are obtained two identical membrane-based vaporizers useful for producing gas phase hydrogen peroxide from a source liquid. Each vaporizer is equipped with a reservoir that receives one or another type of a hydrogen peroxide solution. In the arrangement of components of each apparatus, a tube conveys the source liquid from the reservoir to the ion exchange separation membrane, which is made of PFSA-TFE copolymer and sold under the NAFION® trademark (E.I. du Pont de Nemours & Co., Wilmington, Del.). The reservoir of the first vaporizer is filled with a 50 w % stabilized aqueous hydrogen peroxide solution (Sigma Aldrich; St. Louis, Mo.), which serves as the replenishment source liquid. The reservoir of the second vaporizer apparatus is filled with a "purified" source liquid that resulted from batch processing of 50 w % stabilized aqueous hydrogen peroxide solution with an amount of NAFION® membrane for a period of time sufficient to permit selective binding of any sodium or potassium ions, and selective adsorption of any other ionic or non-ionic agents that may bind to the membrane. In the batch processing approach, the purification media (i.e., the NAFION® membrane) and the liquid being purified are simply combined and incubated or allowed to stand in a single container before the two components are separated (e.g., by simple removal of solid material; or by straining, filtering, etc.).

When operated under standard conditions, the first vaporizer generates steady levels of hydrogen peroxide gas over the course of about a week. The second vaporizer, using the purified replenishment source liquid, generates steady levels of hydrogen peroxide gas for a time longer than a week. This illustrates how use of the purified replenishment source liquid improves vaporizer function, for example by permitting steady gas production over a longer period of time, and by extending the useful life of the ion exchange separation membrane.

In an alternative approach for production of the purified replenishment source liquid, a cartridge containing NAFION® ion exchange media is inserted in-line with the tube conveying liquid from the reservoir of a membrane-based vaporizer to the ion exchange separation membrane of the vaporizer. This arrangement facilitates on-board purification of the replenishment source liquid so that purified replenishment source liquid, and not the replenishment source liquid (i.e., containing metal ions, stabilizers, etc.) reaches the ion exchange separation membrane.

While the invention has been described in detail with respect to certain embodiments, the invention is not limited to those embodiments. It should be understood that modifications and combinations may be made to the illustrated embodiments and other disclosed features to form yet additional embodiments within the scope of the invention.

We claim:

1. A method of improving performance of a membrane-based vaporizer system, the method comprising:

a) providing in a reservoir of a membrane-based vaporizer system a stabilized liquid solution comprising 10 weight % or more hydrogen peroxide or hydrazine and one or more cations;

b) contacting the stabilized liquid solution with a perfluorinated ion exchange polymer to produce a purified liquid solution having 50 weight % or more of the one or more cations removed therefrom;

c) conveying the purified liquid solution to contact a perfluorinated ion exchange membrane of the membrane-based vaporizer system;

d) allowing hydrogen peroxide or hydrazine vapor to pass through the perfluorinated ion exchange membrane into a head space of the membrane-based vaporizer system; and e) delivering a stable concentration of the vapor from the head space to a critical process or application, thereby improving performance of the membrane-based vaporizer system by preventing the stabilized liquid solution from reaching the perfluorinated ion exchange membrane of the membrane-based vaporizer system.

2. The method of claim 1, wherein the step of delivering comprises exposing the vapor within the head space to sub-atmospheric pressure.

3. The method of claim 1, further comprising passing the vapor through a second ion exchange polymer membrane prior to delivering the vapor to the critical process or application.

4. The method of claim 1, further comprising contacting the vapor with a carrier gas within the head space to form a combined gas stream and delivering the combined gas stream to the critical process or application.

5. The method of claim 1, wherein the stabilized liquid solution is substantially free of water.

6. The method of claim 1, wherein the stabilized liquid solution further comprises a non-aqueous excipient.

7. The method of claim 6, wherein the non-aqueous excipient is selected from alcohols, phenols, lactones, amides, esters, ethers, carboxylic acids, sulfonic acids, sulfinic acids, phosphonic acids, phosphinic acids, organic solvents, inorganic solvents, aromatic compounds, polyaromatic compounds, heterocyclic compounds, fluorinated ethers, fluorinated alcohols, fluorinated sulfonic acids, fluorinated carboxylic acids, fluorinated phosphonic acids, deep eutectic solvents, and combinations thereof.

8. The method of claim 1, wherein the one or more cations are selected from the group consisting of sodium, potassium, barium, calcium, copper, magnesium, manganese, nickel and zinc.

9. The method of claim 8, wherein the one or more cations are derived from sodium stannate or potassium stannate.

10. The method of claim 1, wherein the stabilized liquid solution comprises 15 ppm or less by weight of metal cations.

11. The method of claim 1, wherein the stabilized liquid solution comprises 10 ppm or more by weight of metal cations.

12. The method of claim 1, wherein the stabilized liquid solution comprises 14 weight % or more of hydrogen peroxide.

13. The method of claim 1, wherein the perfluorinated ion exchange polymer in step b) is in the form of a bead or pellet.

14. The method of claim 1, wherein the step of contacting in step b) comprises passing the stabilized liquid solution through a packed bed comprising the perfluorinated ion exchange polymer or placing the perfluorinated ion exchange polymer in the reservoir containing the stabilized liquid solution.

15. The method of claim 1, wherein the perfluorinated ion exchange polymer is a perfluorinated polysulfonic acid polymer.

16. The method of claim 1, wherein the ion exchange membrane in the membrane-based vaporizer system is a polysulfonic acid polymer membrane or a perfluorinated polysulfonic acid polymer membrane.

17. The method of claim 3, wherein the second ion exchange polymer membrane is a polysulfonic acid polymer membrane or a perfluorinated polysulfonic acid polymer membrane.

18. The method of claim 1, further comprising the step of regenerating the perfluorinated ion exchange polymer of step b) by contacting the polymer with an acid.

19. The method of claim 18, wherein the acid is nitric acid.

20. The method of claim 1, further comprising heating the purified liquid solution prior to or during the step of conveying the purified liquid solution to contact the perfluorinated ion exchange membrane within the membrane-based vaporizer system.

21. The method of claim 4, further comprising heating the carrier gas prior to contacting with the vapor.

22. The method of claim 1, wherein the stabilized liquid solution is contacted with the perfluorinated ion exchange polymer for about 5 seconds to 3 hours prior to the step of conveying.

23. The method of claim 12, wherein the stabilized liquid solution comprises 25 weight % or more of hydrogen peroxide.

24. The method of claim 23, wherein the stabilized liquid solution comprises 50 weight % or more of hydrogen peroxide.

25. The method of claim 1, wherein the stabilized liquid solution is an aqueous hydrogen peroxide solution containing 30 weight % or more of hydrogen peroxide.

26. A method of improving performance of a membrane-based vaporizer system, the method consisting of:

a) providing in a reservoir of a membrane-based vaporizer system a stabilized liquid solution of 10 weight % or more of hydrogen peroxide, wherein the stabilized liquid solution contains one or more cations;

b) contacting the stabilized liquid solution with a perfluorinated ion exchange polymer to produce a purified liquid solution having 80 weight % or more of the one or more cations removed therefrom;

c) conveying the purified liquid solution to contact a perfluorinated ion exchange membrane in the membrane-based vaporizer system;

d) allowing hydrogen peroxide vapor to pass through the perfluorinated ion exchange membrane into a head space of the membrane-based vaporizer system; and e) delivering a stable concentration of the vapor from the head space to a critical process or application, thereby improving performance of the membrane-based vaporizer system by preventing the stabilized liquid solution from reaching the perfluorinated ion exchange membrane of the membrane-based vaporizer system.

27. The method of claim 26, wherein the stabilized liquid solution is contacted with the perfluorinated ion exchange polymer for about 5 seconds to 3 hours prior to the step of conveying.

28. The method of claim 26, wherein the stabilized liquid solution is an aqueous hydrogen peroxide solution containing 30 weight % or more of hydrogen peroxide.

\* \* \* \* \*